No. 843,096. PATENTED FEB. 5, 1907.
W. F. POST.
LOCK NUT FOR VEHICLE HUBS.
APPLICATION FILED JAN. 15, 1906.
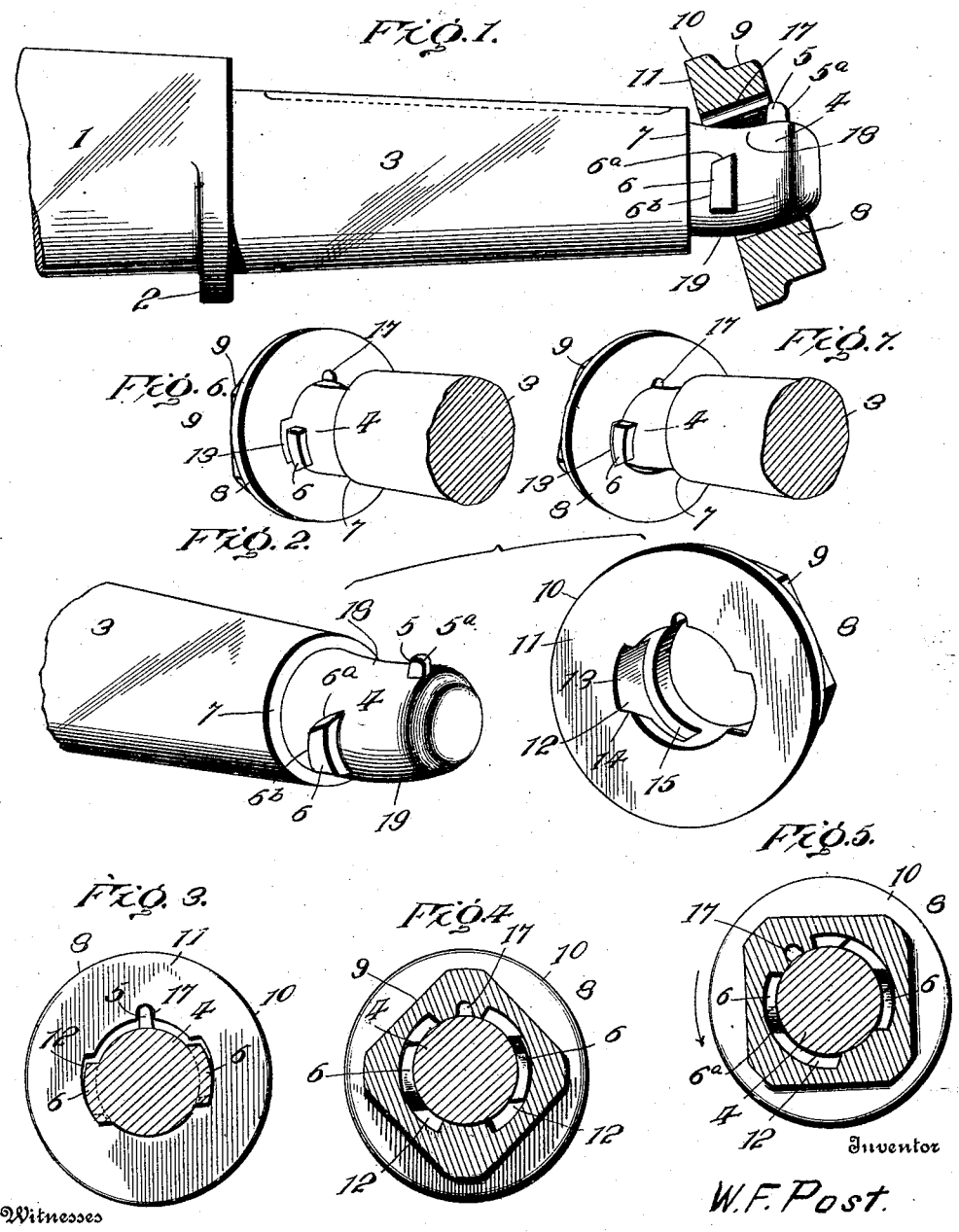
Witnesses
Inventor
W. F. Post.
By
Attorneys

UNITED STATES PATENT OFFICE.

WILLIAM F. POST, OF HATTIESBURG, MISSISSIPPI.

LOCK-NUT FOR VEHICLE-HUBS.

No. 843,096.  Specification of Letters Patent.  Patented Feb. 5, 1907.

Application filed January 15, 1906. Serial No. 296,146.

*To all whom it may concern:*

Be it known that I, WILLIAM F. POST, a citizen of the United States, residing at Hattiesburg, in the county of Perry and State of Mississippi, have invented certain new and useful Improvements in Lock-Nuts for Vehicle-Hubs, of which the following is a specification.

My invention relates to improvements for fastening vehicle-wheels on axle-spindles; and the object of the invention is to provide a clutching lock-nut to be made either right or left handed and embodying a novel construction and arrangement of parts whereby the nut may be readily secured in place and detached from the axle by the proper manipulation and at the same time will be secured from accidental displacement.

To this end my invention consists of a clutch lock-nut, so arranged and constructed with respect to mating parts on the spindle of the vehicle-axle that in order to properly apply the nut in place a groove therein must be first registered with a lug on the spindle and subsequently tilted so as to assume a somewhat oblique position with respect to the axle before the nut can pass farther over the lug of the spindle and into locking engagement by a partially rotary movement with keys on the spindle that work in bayonet-slots in the nut.

The invention also consists, in addition to the features set forth in the preceding paragraph, in a novel construction and arrangement of clutch lock-nut with respect to the spindle, all as will be hereinafter fully set forth, and particularly pointed out in the appended claims.

For a full description of the invention and the merits thereof and also to acquire a knowledge of the details of construction of the means for effecting the result reference is to be had to the following description and accompanying drawings, in which—

Figure 1 is a side elevation of a portion of an axle with my improved clutch lock-nut shown thereon in the applying position. Fig. 2 is a perspective view of the end portion of the axle and includes also a similar view of the nut shown detached therefrom. Figs. 3 and 4 are transverse sectional views looking, respectively, at the inner face and the outer face of the nut. Fig. 5 is a sectional view with the nut shown in locked position. Figs. 6 and 7 are detail perspective views illustrating the manipulation necessary to properly apply the nut, as will be hereinafter described.

Corresponding and like parts are referred to in the following description and indicated in all the views of the drawings by the same reference characters.

Referring to the drawings, the numeral 1 designates a portion of an axletree provided with a butt flange or collar 2, beyond which extends a spindle 3, having a nut-receiving end 4 of reduced diameter and designed to accommodate my improved construction of clutch lock-nut. The end 4 of the spindle is provided near its outer extremity with a radially-projecting lug 5, preferably beveled on its outer edge, as indicated at $5^a$. The said end is also provided at diametrically opposite points, preferably in a plane out of alinement with and parallel to the transverse plane of the lug 5 and at right angles to said lug, with two keys 6, which extend circumferentially, as shown, and are both spaced from the outwardly-facing shoulder 7, formed by the reduced diameter of the end 4, so as to provide a passage-way for a portion of the lock-nut. Both of the keys 6 are preferably beveled at the same end, circumferentially considered, as shown at $6^a$, and have their inner sides beveled toward said ends, as shown at $6^b$.

My improved clutch lock-nut 8 is provided with the usual polygonal outer portion 9 for the accommodation of a spanner-wrench or to serve as a convenient handhold, and it is also provided with an inner rim-like portion 10, having a flat inner face 11, designed to coact with the butt-flange 2. The lock-nut 8 is provided with two bayonet-slots 12, which extend inwardly through the innermost face of the lock-nut and whose entrance portions, that thus extend inwardly, as described, (said portions being designated 13,) are beveled at the same end and in the same direction, circumferentially considered, toward their innermost circumferentially-extending portions, as shown. The said beveled walls or portions of the said slots are designated 14, and their inner walls or locking portions are designated 15.

The bayonet-slots before described are intended to receive and accommodate the keys which are first to enter through the entrance portions 13 and then along the circumferentially-extending portions 15 by a partial rotation of the lock-nut, so as to secure the said nut in locked position on the spindle.

The essential element of my invention consists, in combination with the lock-nut provided with the bayonet-slots and keys before described, of the provision of a transversely-extending groove 17 in the inner wall of the nut and a particular formation of the surface of the nut-receiving end of the spindle. The said end of the spindle, as will be best seen by reference to Figs. 1 and 2, is provided between the lug 5 and the shoulder 7 with a comparatively small dished portion 18 and with a corresponding bulge or convex portion diametrically opposite thereto, as indicated at 19. The groove 17 is intended to receive the beveled lug 5, before mentioned, and it is to be particularly noted that the depth of the groove, the height of the lug, and the opening in the ring-like nut are so proportioned with respect to the bulge 19 that the said bulge will constitute a wedge and bind in the opening in the nut and at the same time cause the keys 6, either or both of them, to abut against the rear face of the nut and not enter the entrance-openings of the bayonet-slots so long as the nut assumes a position at right angles to the length of the spindle as it is being pushed upon the same, all as illustrated in Fig. 6.

In order to overcome the wedging effect of the bulged portion 19, it is necessary to slightly tilt the nut to a position shown in Figs. 1 and 7 of the drawings, which will allow the nut to rock on the bulged portion, while its opposite portion is accommodated by the recessed or dished portion 18. This will permit the keys to pass into the entrance-openings of the bayonet-slots and thence into the locking portions thereof, so that the nut may be partially turned and locked in place.

It is to be understood that the dished portion 18 is not necessary to the extent illustrated in the accompanying drawings; in fact, it may be altogether omitted so long as sufficient play is permitted at that portion of the nut opposite where it contacts with the bulged portion 19 of the spindle to allow the nut to tilt slightly.

Fig. 7 illustrates in a manner corresponding to Fig. 6 how the nut is permitted to pass into complete locking engagement with the reduced end of the spindle when tilted to the proper position. The reverse of the operation is similar.

In order to detach the nut from the spindle, it is first necessary to tilt it slightly over the bulged portion 19 to allow the lug 5 to enter the groove 17.

From the foregoing description, in connection with the accompanying drawings, it will be seen that I have provided an improved construction of clutch lock-nut that can only be placed on the spindle and detached therefrom by a predetermined manipulation, one essential feature of which is the tilting to a slightly oblique position. In view of this arrangement the accidental displacement of the nut is rendered very remote, because the adjacent portion of the wheel will bear against the rim-like portion 10 of the nut and will prevent this tilting movement.

Having thus described the invention, what is claimed as new is—

1. A device of the character described, comprising a spindle provided with a nut-receiving end and a nut arranged to slide on said end, and an interlocking means between said spindle end and nut, said means including a bulged portion on the spindle end which wedges in the nut and prevents the complete insertion of the latter over the said end except by the tilting of the nut on said end.

2. A device of the character described, comprising a spindle provided with a reduced end having a bulged portion and a corresponding opposite dished portion, a nut arranged to be slid over said end of the spindle and designed for locking engagement therewith, the proportion of the nut and the bulged portion being such that the nut is required to be tilted on the spindle end to effect the complete insertion of the former over the latter.

3. A device of the character described, comprising a spindle provided with a nut-receiving end having locking-keys and a lug and provided with a bulged portion opposite said lug, and a nut provided with bayonet-slots for locking engagement with said keys and provided with a groove through which said lug is designed to pass, the proportion of the parts being such that the bulged portion will wedge in the nut and preclude the passage of the nut onto and over the end of the spindle in a straight direction.

4. A device of the character described, comprising a spindle provided with a nut-receiving end, the latter being formed with a key and a lug, a nut provided with a locking-slot for the reception of said key and with a groove through which the lug is designed to pass, the spindle end and nut being so arranged as to require a tilting of the latter on the former preparatory to registering the key with the entrance portion of the slot.

5. A device of the character described, comprising a spindle provided with a reduced end having opposite keys and a laterally-extending lug at its outer end and provided near said lug with a dished portion and also provided with an opposite bulged portion and a nut provided with bayonet-slots for the reception of said keys and a groove through which the lug is designed to pass, the proportion of said groove and lug and the bulged portion of the reduced end of the spindle being such as to require the nut to be tilted to an oblique position preparatory to effecting the engagement and disengagement of the keys with and from the slots.

6. A device of the character described, comprising a spindle provided with a reduced end having opposite keys and a laterally-extending lug at its outer end and provided near said lug with a dished portion and with an opposite bulged portion, the keys being provided with beveled walls and a nut provided with bayonet-slots for the reception of said keys, and a groove through which the lug is designed to pass, the proportion of said groove and lug and the bulged portion of the reduced end of the spindle being such as to require the nut to be tilted to an oblique position preparatory to effecting the engagement and disengagement of the keys with and from the slots, the said slots opening inwardly at the inner face of the nut and provided with circumferentially-extending locking portions and beveled walls leading from the inwardly-opening portions into said locking portions substantially as described.

In testimony whereof I affix my signature in presence of two witnesses.

WILLIAM F. POST. [L. S.]

Witnesses:
A. A. MONTAGUE,
O. R. S. POOL.